Figure 1:
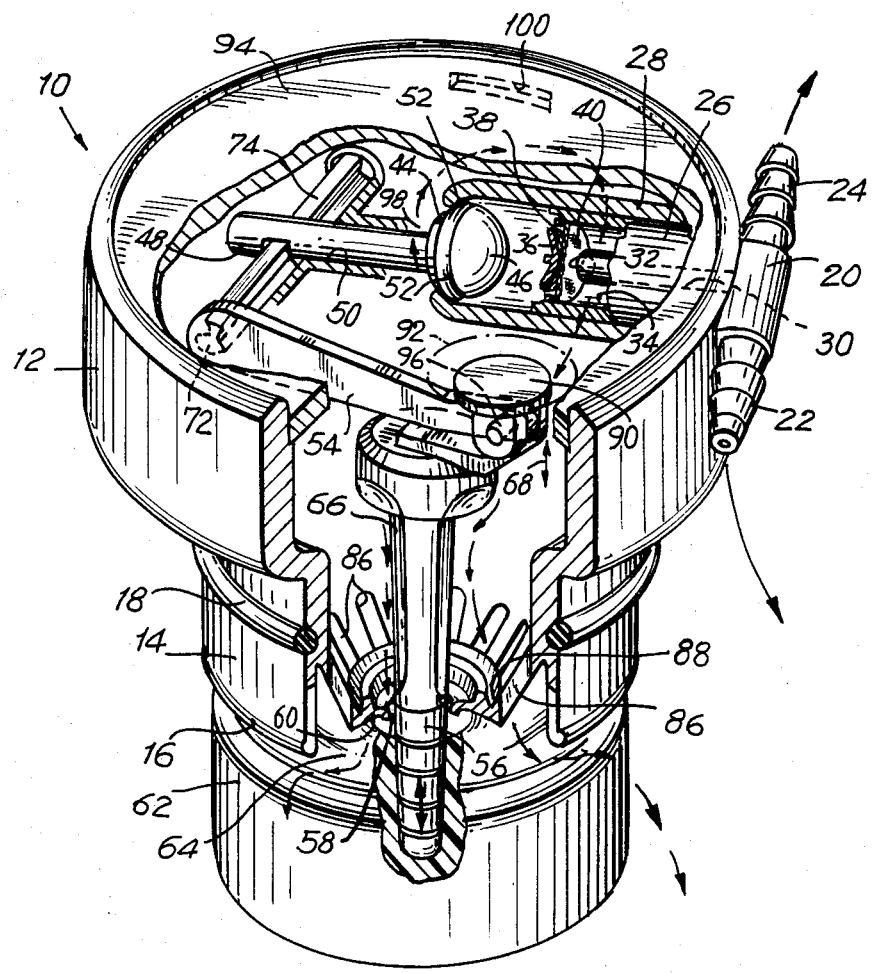

United States Patent [19]

Oschmann

[11] Patent Number: 4,512,378
[45] Date of Patent: Apr. 23, 1985

[54] AUTOMATIC FILLING DEVICE FOR BATTERY CELLS

[76] Inventor: Klaus Oschmann, Mitterweg 9, Feldgeding, Fed. Rep. of Germany

[21] Appl. No.: 476,868
[22] PCT Filed: Jul. 13, 1982
[86] PCT No.: PCT/EP82/00150
§ 371 Date: Mar. 14, 1983
§ 102(e) Date: Mar. 14, 1983
[87] PCT Pub. No.: WO83/00260
PCT Pub. Date: Jan. 20, 1983

[30] Foreign Application Priority Data

Jul. 13, 1981 [DE] Fed. Rep. of Germany ....... 3127619

[51] Int. Cl.³ .............................................. B65B 3/04
[52] U.S. Cl. ..................... 141/98; 137/429; 74/110
[58] Field of Search ............... 137/429; 141/192–229, 141/285–310, 94, 95, 96; 74/105, 110

[56] References Cited

U.S. PATENT DOCUMENTS 2,578,926 12/1951 Douglas ............................ 141/213

Primary Examiner—Houston S. Bell, Jr.
Attorney, Agent, or Firm—Hubbell, Cohen, Stiefel & Gross

[57] ABSTRACT

Device for the automatic filling of battery cells with water comprises a filling cup (10) to be inserted into a battery cell and provided with a connection hose (20) for the water supply as well as a valve actuated by a float (62) fitted to a single centering guide rod (56) for easy movement and not susceptible to clogging up, the rod extending through an opening (58) in the bottom (60) of the cup housing (12) and hinged at its upper end to an amplifying lever (54) for the transmission of the float movement to the valve body (46), so that even in the remote possibility of heavy movement of the float guide, the lifting force of the float (62) is sufficient to actuate the valve.

20 Claims, 5 Drawing Figures

AUTOMATIC FILLING DEVICE FOR BATTERY CELLS

The object of the invention is a device for the automatic filling of battery cells with water comprising a filling cup to be inserted into the cell and provided with a connection hose for the water supply as well as a valve actuated by a float.

The water in the diluted sulphuric acid in the battery cells evaporates due to the current density, i.e., the cyclic load of batteries driving vehicles, forklift trucks etc. To prevent the electrolytic level in the cells sinking below the minimum level, the batteries have to be checked at regular intervals and the cells refilled with chemically clean water.

Automatic devices as described above are already known to help save time and work in refilling. For this, the inlet of the filling cup of each battery cell is connected by a common pipe with a central tank from which the water is pumped by means of a pressure generator and fed into the cells. When the required electrolytic level is reached, the float closes the valve of the particular battery cell. Such a system is for example, described in German Utility Model No. 72 31 500.

German Utility Model No. 69 15 774 shows a multicellular accumulator with a filling device equipped with measuring electrodes projecting into the accumulator cells. As soon as the required electrolytic level is reached, magnetic valves, which stop the water supply, are closed by the measuring electrodes.

In another device of the kind described above, the float opening and closing the valve is connected by a U-shaped yoke with the valve body. The two vertical bars of the yoke are guided in longitudinal grooves in the valve housing while the float is additionally guided by a relatively long centrally situated sliding guide in its vertical movement. This kind of guide has a considerable disadvantage as the floating particles which are always present in diluted sulphuric acid of a battery cell can get into the guide channels so that the performance is impaired or even clogs up so that the opening and closing of the valve can not be guaranteed. This results in the necessity to dismantle and clean the respective parts, not to mention that due to the faulty closure of the valve, the water runs out and soils the cell surface. This itself cancels the advantages of automatic refilling against manual refilling of the battery cells. A further disadvantage of this known filling cup consists in the direct connection of the float with the valve body so that the power opening the valve is only equal to the buoyant force of the float. This leads into difficulties, especially at the time when the relatively long guiding channels of the float clog up. In addition to this, the water jet in this known filling tube system, supplied by the pipe connection, is in an unbroken flow directed at the valve body so that at times, the strong jet closes the valve prematurely before the required acid level in the cells have been reached.

The object of the invention is to improve a device based on the afore-mentioned systems in such a way that the motion of the float and of the valve body are extremely easy and not prone to clogging and even in case of sluggishness of the float guide the force exerted by the float is sufficient to actuate the valve unimpaired and safely.

In the invention this has been concluded by the connection of the float on a single centrally placed guide rod led through an opening in the body of the cup housing and at its upper end hinged with an amplifying lever for the transmission of the float movement to the valve body.

The solution provided by the invention has the distinct advantage that only one sliding guide for the float is required which can be kept so short that clogging by floating particles of the electrolytes can be largely avoided. In the event of this remote possibility of the slidability of the float being impaired, the buoyant force is still sufficient to close the valve as there is no direct connection between the float and valve but an amplifying lever which transmits the float movement to the valve body.

A further advantageous development of this invention is the provision of a dish-shaped recess to receive water on the upper surface of the voluminous float made of light-weight plastic. The "water weight" in this dish-shaped recess provides the necessary weight to lower the float in spite of its limited weight in response to a lowering of the electrolytic level. A second function of this dish-shaped recess is a neutralization of the water weight and increase of lift in case of a malfunction on account of heavy sliding or even clogging up of the guide and joints of the float then becomes completely flooded by the water supply.

The transmission ratio between guide rod and the amplifying lever should preferably be 1:16. This means that the lift force of the float of approximately 15 grams, required for the closure of the valve, is amplified to more than 200 grams.

In a further development of the invention it is intended that to transmit the power from the amplifying lever to the valve body, a shaft is attached to the amplifying lever mounted in the cup housing which engages with its toothed segment into a groove of the valve shaft.

This also contributes to an easy running transmission of power so that an assured opening and closure of the valve without jamming is guaranteed.

A further feature of the invention is that the valve body is arranged in a cylindrical inlet pipe of the cup housing which contains a conical seat for the valve head against which it rests, sealing it in the closed position with the help of a gasket. Preferably, the conical seat should have an angle of 120°.

These measures have proven in the practical embodiment that the valve body closing with a force of approximately 200 grams results in an optimal sealing. The effectiveness of the sealing is reinforced by the water pressure of 1.5 to 2.0 bar at the valve head.

According to the invention, a throttle tube is built into the water inlet pipe. Preferably, a baffle plate is placed between the throttle tube exit and the valve head to direct the water flow to the wall of the inlet pipe.

Thus, unrequired pressure forces acting in the closing direction of the valve are avoided as the water jet does not hit the valve head with full force.

This advantageous effect is fortified by the trumpet-shaped exit of the throttle tube which reduces the inlet speed of the feeding jet still further.

In order not to feed any dirt particles into the device where these can settle on joints and guides, a filter is built in between the throttle inlet tube and the baffle plate. For the same reason a dirt collecting chamber is provided around the throttle inlet tube.

Longitudinal grooves are cut into the guide rod of the float to provide an unobstructed flow of the water from the cup housing into the battery cells and to avoid a settling of foreign particles in the sliding guide of the guide rod of the float.

Another characteristic of the invention is the provision of very fine slots, preferably star-shaped, in the bottom of the cup housing, which at least partly, run into dirt collecting chambers on the upper bottom surface and are all sharp-edged on the lower bottom surface.

The remaining water, which did not flow along the longitudinal grooves of the guide rod, reaches the battery cells via these slots. The free slots thereby hold back possible foreign particles which will settle in the dirt collecting chambers without reaching the guide channel between the guide rod of the float and the bottom of the cup housing. The sharp edging of the slots on the lower side has the advantage of acting as fender and preventing a feed back of dirt particles from the battery cells into the cup housing through these slots. In addition to this, these very fine slots are an escape route for gas or acid fumes without the attachment of liquid particles so that the dried gas can rise through vent holes in the cup housing and escape without spilling onto the outside of the device or the battery.

Further features and advantages of the invention will be apparent from the following specification of a preferred example of the invention shown in the drawings.

Figure 2:
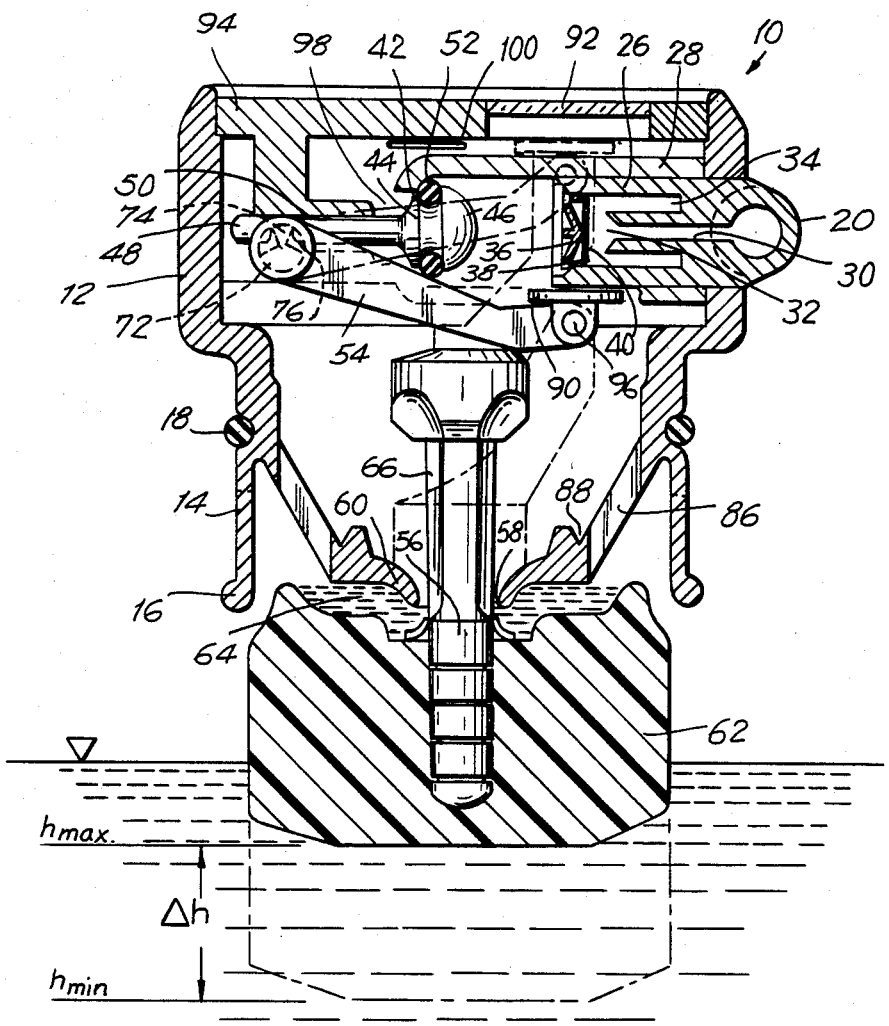
Figure 3:
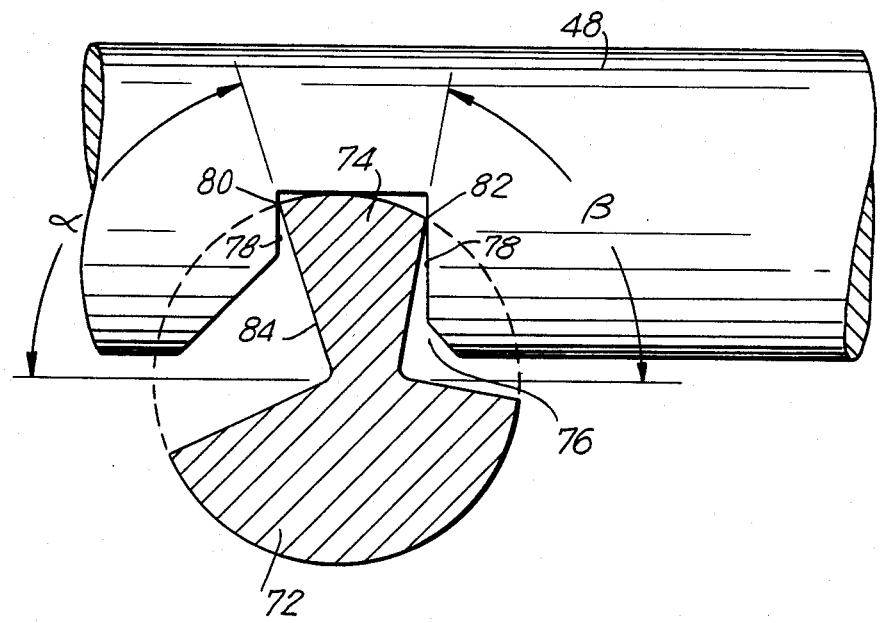
Figure 4:
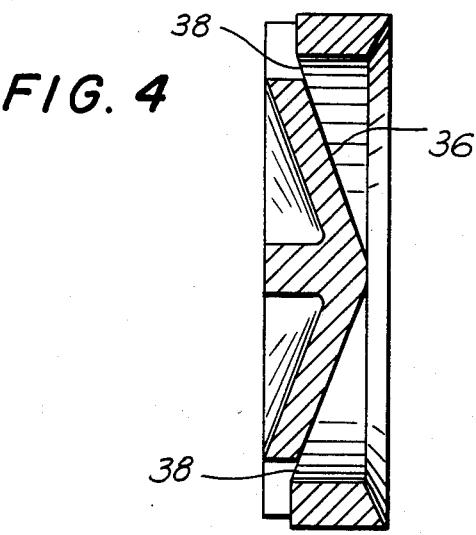
Figure 5:
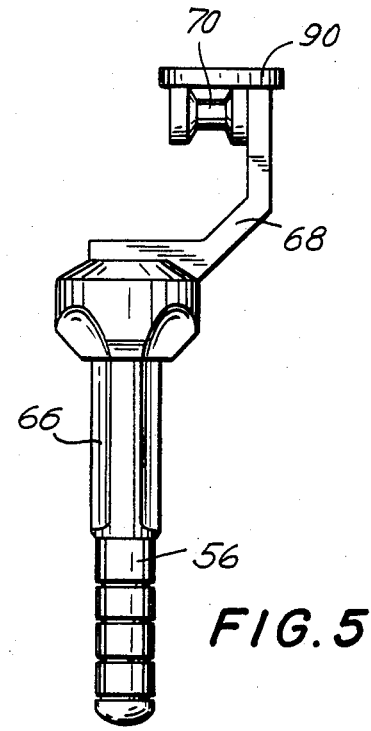

FIG. 1 is a perspective partly sectional, open view of the device in accordance with the invention, FIG. 2 is a longitudinal section of the device shown in FIG. 1, FIG. 3 is a enlarged schematic representation of the connection between the shaft of the amplifying lever and the valve body, FIG. 4 is an enlarged longitudinal section of the baffle plate and FIG. 5 is a side view of the guide rod of the float.

As shown by FIGS. 1 and 2, the preferred device for the automatic filling of battery cells with water consists of a filling cup 10, of which the cup housing 12 is placed into the filling opening of the battery cell, which is not shown. The lower edge of the cup housing 12 is made of spring tongues 14 having enlarged lower edges 16 which elastically grip the lower edge of the filling opening of the battery cell after insertion of the cup housing 12 therein. For sealing the gap between the filling opening and the casing of the cup housing 12 a gasket 18 is provided which is placed in an annular groove in the outer wall of the cup housing 12. Above the gasket 18 the cup housing 12 is enlargened for defining a shoulder which rests on the cell surface.

It is to be seen in FIG. 1 that the pressurized water intake from a water supply (not shown) is through a T-formed connection 20 on the outside of the cup housing 12 which has two pipe connections 22 and 24 to which water hoses can be fitted in the known manner. The connection 22 serves to feed chemically clean water to the filling cup while the connection 24 passes the water not fed into the filling cup 10 to the next filling cup (not shown).

FIG. 2 shows that the internal end 26 of the T formed connection 20 is inserted into an inlet pipe 28. Formed inside the end 26 is a throttle tube 30 which, in the embodiment shown, has a length of 14 mm and a diameter of 0.9 mm. The exit 32 of tube 30 is trumpet shaped. Around the throttle tube 30 within the internal end 26 is a circular dirt collecting chamber 34.

FIG. 2 also shows that at the exit 32 of the throttle tube 30, looked at in the flow direction, is a baffle plate 36 (shown in FIG. 4) which is force fitted into a notch at the internal end 26 of the tube. The baffle plate 36 has four outlet slots 38 distributed about its circumference.

A filter 40 is installed between the inlet tube exit 32 and the baffle plate 36.

The inlet pipe 28 has on its end, approximately at the center thereof, a conical seat 42 for a valve head 44 of a valve 46 whose shaft 48 is movable in a horizontal direction as shown by the double arrows (FIG. 1) in a narrow bore 50 of the inlet tube 28. The valve head 44 has an annular groove for a gasket 52 which in the closed position of the valve 46 forms a seal with the conical seat 42 at an angle of 120°.

The valve shaft 48 is connected through an amplifying lever 54 to a guide rod 56 which is centrally seated in the cup housing 12 and protrudes through a circular opening 58 in the bottom 60 thereof. A float 62 is disposed on the lower end of the guide rod 56.

The relatively voluminous float 62 is made of a very lightweight plastic e.g. polystyrene. In the embodiment shown, the volume is calculated so that the uplift transmitted to the guide rod 56 is approximately 15 grams. On the upper side of the float 62 is a dish-shaped recess 64 which can be filled with water.

The center part of the guide rod 56 which slides through a nearly linear guide formed by the circular opening 58 in the bottom 60 has four longitudinal quadrant shaped grooves 66. These longitudinal grooves 66 have the two functions of feeding water from the cup housing 12 into the battery cell and of keeping the guide of the opening 58 free so that no foreign particles can settle. The water film formed on the guide rod 56 insures easy movement of the guide.

FIG. 5 shows that the thickened upper end of the guide rod 56 is joined to an arm 68 incorporating a bolt 70 for supporting the amplifying lever 54. To transmit the vertical float movement to the horizontally slidable valve body 46, one end of the amplifying lever 54 is connected to a horizontal shaft 72 seated in the cup housing 12.

This shaft 72 has, at least in the area of the valve shaft 48, a toothed segment 74 which fits into a notch 76 of the valve shaft 48. FIG. 3 shows that the notch 76 has two vertical walls 78 onto which rests corner edges 80 and 82 of the toothed segment 74 which is widest at its outer surface and tapered inwardly therefrom. The corner edge 80 of the toothed segment 74 moves the valve body 48 into a closed position when the shaft 72 turns counterclockwise. The edge 80 defines a radial plane 84 which stands vertically in the open position of the valve 46 and, as shown in FIG. 3, forms an angle α of 71° to the horizontal plane passing through the shaft center point in the closed position. Consequently the shaft 72 rotates 19° from the open to the closed position and vice versa.

FIG. 3 shows further that the edge 82 of the toothed segment 74 moves the valve 46 into an open position when the shaft 72 turns clockwise. The edge 82 defines a radial plane of the shaft 72 which forms an angle β of 59° to the horizontal plane passing through the shaft center in the closed position of the valve 46. Therefore, it follows that by the above-mentioned rotation of the shaft 72 by 19° the angle β in the open position of the valve body 46 will be 40°.

The maximum width of the toothed segment 74 and the width of the notch 76 amount in the cited example to 1.3 mm while the height of the notch 76 is 1.25 mm and that of the toothed segment is 1.5 mm.

The bottom 60 of the cup housing 12 has fine star-shaped slots 86 which are rounded on their upper edges and radiate inwards to the circular dirt collecting chamber 88. The lower edge of those slots 86 (on the underside of the bottom 60) are sharp-edged and therefore prevent the return flow of water or foreign particles.

On the upper end of the guide rod 56 or, to be more precise, on the upper end of the arm 68, an indication disk 90 is fixed which in the uppermost position of the float 62, ie. when the valve is closed, is visible through a window 92 in the lid 94 of the housing 12.

In operation when the float 62 sinks because of a low electrolytic level, (its lowest position is indicated in FIG. 2 by $h_{min}$ and its highest position by $h_{max}$, whereby the lift of the float 62$\Delta$h is very high and in the cited example amounts to 11 mm) the amplifying lever 54, having in the cited example an effective length of 24 mm, turns clockwise on the easy going swivel joint 96 so that it turns the shaft 72 clockwise whereupon the edge 82 of the toothed segment 74 moves the valve body 46 to the right into its open position. A transmission ratio of 1:16 is obtained by the mentioned transmission from the guide rod 56 through the amplifying lever 54 to the valve body 46.

The water fed by a pressure tank through a pipe (not shown) to the T-formed connection 20 has a pressure of approximately 1.5 to 2.0 bar and is reduced in the throttle tube 30. The trumpet-shaped tube exit 32 ensures a velocity reduction while the following filter 40 keeps back floating particles and dirt which will be rinsed into the dirt collecting chamber 34. The baffle plate 36 guides the water to the four outlet slots 38 wherefrom its passes along the inside wall of the inlet pipe 28 and therefore no direct pressure is brought to bear against the surface of the valve head 44.

The water is then fed through a large opening 98 in the upper part of the inlet pipe 28 behind the valve seat 42 and underneath the lid 94, where it flows under the window 92.

From here the water in the cup housing 12 flows down whereby a part of it flows along the guide rod 56 through the opening 58 while the remaining water flows through the fine slots 86 which cleanse the water by removing floating particles. The water flow is indicated in FIG. 1 by arrows.

When the float has reached the required electrolytic level $h_{max}$, the amplifying lever 54 has meanwhile been moved counter-clockwise so that the edge 80 of the toothed segment 74 has moved the valve shaft 48 to the left thereby closing the valve.

The above described and shown form of the toothed segment 74 and its interaction with the vertical walls 78 of the notch 76 in the valve shaft 48 ensures that the valve in the open position remains open even if the inflowing water rushes in in an abrupt manner. Due to the limited, very small horizontal movement of the toothed segment 74 in the notch 76, a secure closure of the valve is possible without jamming.

During the filling operation, the indication disk 90 moves towards the window 92 so that the filling state, as well as a too low electrolytic level at which the indication disk is not visible, can be checked. The water flow at each filling keeps the window 92 clean.

The battery, when used e.g. during driving of vehicles, fork lift trucks or the like, moves constantly and with it the electrolytic level thereby providing a "trimming" of the system. It prevents a settlement of floating particles on the swivel joint 96, on the toothed segment 74 and on the guide rod 56 near the opening 58 whereby the long lift of the float 62 is very advantageous.

For purposes, slots 100 are provided in the cup housing 12.

I claim:

1. In a device for the automatic filling of battery cells with water of the type comprising a filling housing defining a filling cup to be inserted into the cell, a connection means for connection to a water supply, a valve actuated by a float for interrupting the flow of water from said water supply to said cell and a lever connecting the valve and the float, the improvement comprising said housing having an opening in the bottom thereof; a guide rod connected at its lower end to said float and extending through said opening, said guide rod being dimensioned for a close fit with said opening for guiding the movement of said float for preventing undesired tilting thereof, and an amplifying lever hingedly secured at one end to the guide rod and at the other end to the valve for transmitting the float movement to the valve body with amplified force.

2. The device in accordance with claim 1, wherein the float is comprised of lightweight plastic and is provided with a recess on its upper surface for receiving water.

3. The device in accordance with claim 1, wherein the transmission ratio of the guide rod to the amplifying lever is about 1:16.

4. The device in accordance with claim 1, further comprising a valve shaft secured to said valve, and an additional shaft mounted in the cup housing, said additional shaft having a toothed segment which seats in a notch provided in the valve shaft, said amplifying lever being secured to said valve by attachment to said additional shaft.

5. The device in accordance with claim 4, wherein the valve shaft is horizontally movable and the notch in the valve shaft is partially defined by two vertical walls, the edges of the toothed segment resting on said walls, said toothed segment widening outwards from the center of the shaft.

6. The device in accordance with claim 5, wherein the edge of the toothed segment which moves the valve into its closed position lies in a radial plane of the shaft which extends vertically in the open position of the valve and in the closed position forms an angle ($\alpha$) approximately 71° with the horizontal plane passing through the shaft center.

7. The device in accordance with claim 6, wherein the edge of the toothed segment which moves the valve into its open position lies in a radial plane of the shaft which forms in the open position of the valve an angle ($\beta$) of approximately 40° with the horizontal plane passing through the shaft center and in the closed position an angle ($\beta$) of approximately 59°.

8. The device in accordance with claim 5, further comprising a cylindrical inlet pipe in the cup housing, a valve head secured to said valve shaft, said inlet pipe having a conical seat for the valve head, and further comprising a gasket disposed about the valve at the valve head for providing a good seal in the closed position.

9. The device in accordance with claim 8, wherein the conical seat defines an angle of approximately 120°.

10. The device in accordance with claim 8, further comprising a throttle tube secured to the inlet side of the inlet pipe, the throttle tube being adapted for connection to the water supply.

11. The device in accordance with claim 10, further comprising a baffle plate disposed between the tube exit and the valve head for deflecting the impact of the incoming water jet.

12. The device in accordance with claim 11, further comprising a filter disposed between the tube exit and the baffle plate.

13. The device in accordance with claim 12, wherein the tube exit is trumpet shaped.

14. The device in accordance with claim 12, further comprising a dirt collecting chamber around the throttle tube.

15. The device in accordance with claim 1, wherein a plurality of longitudinal grooves are provided in the guide rod.

16. The device in accordance with claim 1, further comprising an indication disk fixed to the upper end of the guide rod, and a window provided in the top of the cup housing, the disk being visible through the window when the valve is closed.

17. The device in accordance with claim 1, wherein a plurality of slots are provided in the bottom of the cup housing, one or more of said slots on the upper side of the bottom surface leading to a dirt collecting chamber, said slots being sharp-edged on the lower side of the bottom surface.

18. The device in accordance with claim 1, wherein the transmission ratio of the guide rod to the amplifying lever is greater than 1:1.

19. The device in accordance with claim 1, wherein the guide rod is disposed in the center of the cup housing.

20. The device in accordance with claim 1, wherein said one end of the amplifying lever is hingedly secured to the upper end of said guide rod.

* * * * *